United States Patent [19]

Krajewski, Jr. et al.

[11] Patent Number: 5,590,199
[45] Date of Patent: Dec. 31, 1996

[54] ELECTRONIC INFORMATION NETWORK USER AUTHENTICATION AND AUTHORIZATION SYSTEM

[75] Inventors: Marjan Krajewski, Jr., Acton; John C. Chipchak, Dracut; David A. Chodorow, Groton; Jonathan T. Trostle, Lexington; Peter T. Baldwin, Rowley, all of Mass.

[73] Assignee: The Mitre Corporation, Bedford, Mass.

[21] Appl. No.: 134,399

[22] Filed: Oct. 12, 1993

[51] Int. Cl.$^6$ .............................. H04L 9/32; H04L 9/08
[52] U.S. Cl. ................................... 380/25; 380/4; 380/21
[58] Field of Search ................................ 380/25, 4, 23, 380/21

[56] References Cited

U.S. PATENT DOCUMENTS

| | | |
|---|---|---|
| 4,665,396 | 5/1987 | Dieleman . |
| 4,731,841 | 3/1988 | Rosen et al. . |
| 4,916,738 | 4/1990 | Chandra et al. . |
| 5,146,499 | 9/1992 | Geffrotin ................................... 380/23 |
| 5,237,611 | 8/1993 | Rasmussen et al. . |
| 5,347,580 | 9/1994 | Molva et al. ............................. 380/25 |
| 5,349,643 | 9/1994 | Cox et al. ................................. 380/25 |

OTHER PUBLICATIONS

"Kerberos: An Authentication Service for Open Network Systems" by Jennifer G. Steiner et al., paper presented at Winter USENIX 1988, Dallas, Texas, Jan. 12, 1988, pp. 1–15.

"Evolution of the Kerberos Authentication Service" by John T. Kohl, paper presented at the Spring 1991 EurOpen Conference, Tromsø, Norway, pp. 1–16.

"Designing Security into Smart Card Applications" by G. Frederick Renner et al., paper presented at Card Tech Conference Proceedings, Crystal City, VA, Apr. 1992, pp. 128–132.

"Concept for a Smart Card Kerberos" by Marjan Krajewski, Jr., paper presented at the 15th National Computer Security Conference, Baltimore, MD, Oct. 1992.

"Smart Card Augmentation of Kerberos" by Marjan Krajewski, Jr., paper presented at the Privacy and Security Research Group Workshop on Network and Distributed System Security, San Diego, CA, Feb. 1993.

"Applicability of Smart Cards to Network User Authentication" by Marjan Krajewski, Jr. et al., The USENIX Association, Computing Systems, vol. 7, No. 1, Winter 1994 pp. 75–89.

*Primary Examiner*—Gilberto Barron, Jr.
*Attorney, Agent, or Firm*—Choate, Hall & Stewart

[57] ABSTRACT

A system for authenticating and authorizing a user to access services on a heterogenous computer network. The system includes at least one workstation and one authorization server connected to each other through a network. A user couples a personally protectable coprocessor (smart card) to the workstation by means of a bidirectional communications channel. The coprocessor is adapted to receive signals including first encrypted authentication information and to decrypt the first encrypted authentication information using a preselected first key. The coprocessor is further adapted to assemble and encrypt second authentication information using a preselected second key and to transmit the encrypted second encrypted authentication information to the workstation. The workstation then communicates the information onto the network whereby the user is authenticated to access the networked computer or service.

4 Claims, 3 Drawing Sheets

ELECTRONIC INFORMATION NETWORK USER AUTHENTICATION AND AUTHORIZATION SYSTEM

BACKGROUND OF THE INVENTION

Widespread use of networks to interconnect heterogenous computer services is common today. Typically, in a distributed processing environment, a user will access an unsecured workstation and, using the workstation itself, access a variety of other computer services on the network. But as the use of networks has increased so have the problems relating to securing and controlling the legitimate access of users to the computer systems.

Traditionally, access to computer services was controlled through the use of passwords. Each user was associated with a user id and a password. Both the computer system and the user who wished to access a service had to know the password. The user provided the user id and the computer systems challenged the user to then provide the password. This initiated access to the system.

FIG. 1 represents a typical prior art computer network configuration. A user 10 accesses a workstation 14 which is connected to a network 18. The user 10 then accesses services 20, 22 and 24 from the workstation 14 via the network 18. User authentication is controlled through the use of a password 11 known only by user 10 and services 20, 22 and 24.

A weakness with this authentication scheme can be seen in FIG. 2. Since the workstation 14 is often installed in an unsecured environment, an illicit user may install a trojan horse 15 on the workstation 14 to spy on the input of password 11 by user 10. Further, a password thief 12 may borrow or steal the password 11 from user 10. Finally, a network eavesdropper 16 can intercept the transmission of password 11 to services 20, 22 and 24. All of these methods may be utilized to gain illicit access to service 20, 22 and 24. It will be appreciated that the network 18 can connect many other untrusted workstations and services, compounding the danger if illicit access to network services.

As seen, in a distributed processing environment, a user often needs to access resources located at multiple servers from multiple workstations interconnected via a communications network. Authentication to each host accessed is crucial, but presenting separate user id/password pairs can be both unwieldy and unsecure. What is needed is a mechanism which requires users to identify and authenticate themselves once to a trusted agent which then performs the necessary user identification and authentication to each accessed resource transparently. This is known as unitary login.

Previous work in developing secure unitary login protocols for distributed systems include those intended for open environments (e.g., the Massachusetts Institute of Technology Kerberos protocol, the Digital Equipment Corporation SPX protocol, the Carnegie Mellon University Strongbox protocol, and the ISO OSI Directory Services protocols) and those intended for closed environments (e.g., the World Wide Military Command and Control System (WWMCCS) Information System Network Authentication Service (WISNAS) protocol, the Department of Defense Intelligence Information System Network Security for Information Exchange (DNSIX) protocol, and the Strategic Air Command Intelligence Network (SACINTNET) protocol).

Each of these protocols provides different authentication services (e.g., Kerberos, SPX, WISNAS, DNSIX, and SACINTNET are more connection-oriented while Strongbox and the OSI Directory Services are more process-oriented) and depends upon different mechanisms to provide security (e.g., Kerberos employs conventional encryption, Strongbox employs zero-knowledge proofs, SPX and OSI Directory Services employ public key encryption). None of them are intended for a truly hostile environment (i.e., one subject to active attacks against both workstations/servers and the network). WISNAS, DNSIX and SACINTNET, though designed for military applications, are intended for physically secure environments with trusted users and no eavesdropping threats. The other protocols protect against the threat of network eavesdropping but assume that workstations and servers are protected by other mechanisms (e.g., physical ownership/control). Organizations could greatly ease the problems associated with password management and the threat from masquerading on their increasingly distributed information systems with a unitary login capability which was secure from both a workstation/server and a network perspective.

The Kerberos protocol possesses many advantages as a basis for this capability. Originally developed to provide user authentication for the distributed open computing environment of MIT's Project Athena, Kerberos is growing significantly in popularity (it has been adopted by the Open Software foundation and Unix International as well as being offered in several commercial products). It is based upon the use of a trusted authentication server to provide "tickets" for presentation to other system servers and uses algorithm-independent conventional (secret) key encryption to protect against network eavesdropping and masquerading. This latter feature is especially important for military/intelligence applications in that the current Data Encryption Standard (DES) algorithm might be inadequate for certain environments. If so, it can easily be replaced with a stronger algorithm.

Kerberos utilizes a trusted central authentication server, the Kerberos Authentication Server (KAS). The KAS contains a database of system entities (registered users and services) and its private cryptographic keys. Each user and each service is a separate entry, each with their own cryptographic key. These private keys, known only to the respective entity and the KAS, allow the KAS to communicate privately with the Kerberos agent of each system service (server Kerberos) and with the Kerberos agent of each registered user who wishes to be logged in (client Kerberos). The KAS also contains a "ticket" granting service to provide a trusted means for logged in users to prove their identity to system services. Finally, it contains a key generation service which supplies authorized pairs of entities with temporary cryptographic keys.

The Kerberos protocol is based upon the concept of tickets and authenticators. A ticket is issued by the KAS for a single user and a specified service. It contains the service id, the user id, the user's (workstation) address, a timestamp, the ticket's lifetime and a randomly chosen session key to be used by this service. This information is protected by encryption under the service's private key. Since this key is known only to the service and the KAS, the service is assured of the authenticity of the ticket. Once a ticket is issued, it can be reused by the named user to gain access to the indicated service until it expires. A new ticket can be issued upon the user's presenting his/her appropriate credentials.

Unlike the ticket, the authenticator is built by client Kerberos. A new one must be generated every time the user wishes to use a ticket. An authenticator contains the user's id, the user's (workstation) address, and a timestamp. The authenticator is encrypted with the session key which is associated with the ticket. Encryption of the authenticator assures the service that the user presenting the ticket is the user to whom the original ticket was issued. The agreement of the user id in the authenticator with the user id in the ticket and the address in the authenticator with the address in the ticket proves a user's authenticity. Agreement of the timestamp with the current time proves that this is a fresh ticket/authenticator pair and not a replay of an old pair.

Security within Kerberos is enforced through the protection of session keys during transmission. The initial response from the KAS to the client, upon presentation of the user id, consists of a ticket to the ticket granting service and its associated session key. The ticket granting service ticket is encrypted with the ticket granting service's private key. The ticket granting service session key is encrypted with the client's private key. Additional session keys associated with tickets to system service requested by that particular client are henceforth encrypted in the ticket granting service session key.

Kerberos has been analyzed from a general security perspective. A significant vulnerability involves its manipulation of the user's Kerberos password and other sensitive authentication information (i.e., session keys) within the workstation, thereby making it vulnerable to Trojan Horse threats which could capture such data for later use by an intruder. Another vulnerability involves the threat of repeated attacks at the intruder's leisure following interception of the initial response from the authentication server. This response contains the ticket granting server ticket (required for obtaining other tickets) and its associated session key, which is encrypted using a relatively weak password-derived key. A third vulnerability involves the inherent weakness of depending solely upon a single factor (i.e., a password) for the initial user authentication. Passwords can be easily borrowed or stolen.

SUMMARY OF THE INVENTION

The system, according to the invention, for authentication of a user to a variety of computer services on a network of heterogenous computer systems includes at least one user workstation and one authorization server connected to each other through a network. A user couples a personally protectable coprocessor (smart card) to the workstation by means of a bidirectional communication channel.

The coprocessor is adapted to receive signals including first encrypted authentication information received from the workstation. The first encrypted information is decrypted, using a preselected key, by the coprocessor. The coprocessor is further adapted to assemble second authentication information and to encrypt the second information with a preselected second key. This second information is then transmitted to the workstation. The workstation then communicates the information onto the network.

In preferred embodiments, the preselected first and second keys may either be preprogrammed into the coprocessor or be received by the coprocessor from the authorization server.

In another embodiment, the preprogrammed first and second keys may be stored in an encrypted form and be decrypted using a key derived from a user supplied password.

In another aspect of the invention, the system includes at least one user workstation connected to a network. A user couples a personally protectable coprocessor (smart card) to the workstation by means of a bidirectional communication channel.

The coprocessor is adapted to receive signals including first encrypted authentication information received from the workstation. The first encrypted information is decrypted, using a preselected preprogrammed key, by the coprocessor. The coprocessor is further adapted to assemble second authentication information and to encrypt the second information with a preselected preprogrammed second key. This second information is then transmitted to the workstation. The workstation then communicates the information onto the network.

In greater detail, the invention disclosed here is based upon moving critical cryptographic processing from the workstation into a user-unique smart card and storing the user key in encrypted form on the smart card. The user key would be encrypted in a key derived from a password. In this way, neither possession of the card alone nor knowledge of the password alone would be sufficient to authenticate a user. Encryption and decryption operations and the storage of unencrypted authentication information would occur only within a personally protectable coprocessor (i.e., that of the smart card). Since the user can remove and carry the smart card on the person, the smart card, in effect, forms a personal protectable extension of the workstation processing environment.

Past implementation of user authentication required user intervention when requesting access to a new computer service. Typically, a user presented a user id and password combination for each service or computer system. Access to various computer services was not seamless in that user intervention was required prior to authorization. Each service or computer system required a unique user id and password pair which were known to both the user and the service or computer system.

The authentication mechanism of the present invention provides for authenticating a user on a remote untrusted workstation and allowing access by the user to various secured networked computer services with only a single user login operation.

DESCRIPTION OF THE PREFERRED EMBODIMENT

Kerberos utilizes a trusted central authentication server, referred to herein as the Kerberos Authentication Server (KAS). This central server contains a database of system entities (registered users and services) and their private cryptographic keys. These private keys, known only to the respective entity and the KAS, allow the KAS to communicate privately with the Kerberos agent of each system service (referred to herein as server Kerberos) and with the Kerberos agent of each registered user who wishes to be logged in (referred to herein as client Kerberos). The central server also contains a ticket granting service to provide a trusted means for logged in users to prove their identity to system services. Finally, it contains a key generation service which supplies authorized pairs of entities with temporary cryptographic keys (session keys).

The Kerberos protocol is based on the concept of tickets and authenticators. A ticket is issued by the KAS for a single user and a specified service. It contains the service id, the user id, the user's (workstation) address, a timestamp, the ticket's lifetime and a randomly chosen session key to be used by this user and this service. This information is protected by encryption under the service's private key. Since this key is known only to the service and the KAS, the service is assured of the authenticity of the ticket. Once a ticket is issued, it can be used many times by the named user to gain access to the indicated service until the ticket expires.

Unlike the ticket, the authenticator is built by client Kerberos. A new one must be generated every time the user wishes to use a ticket. An authenticator contains the user's id, the user's (workstation) address, and a timestamp. The authenticator is encrypted with the session key which is associated with the ticket. Encryption of the authenticator provides integrity of the authenticator and assures the service that the user is the system entity who received the original ticket. The further agreement of the user id in the authenticator with the one in the ticket and the address with the one from which the ticket arrived provides further assurance. Agreement of the timestamp with the current time assures the service that this is a fresh ticket/authenticator paid and not a replay of an old pair.

A new user or the administrator of a new system service must first register with Kerberos. Registration consists of making a new entry in the KAS database and issuing an id and private key. In the case of a user, the private key is issued in the form of a password. The administrator of the system service must load the service's private key into the server Kerberos software.

Figure 1:
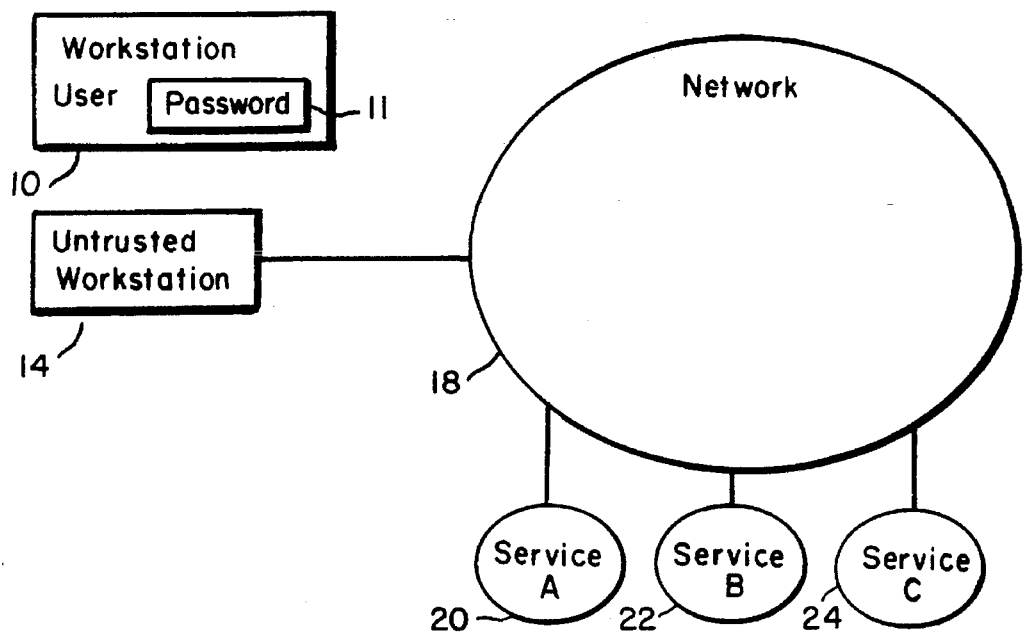
FIG. 1 is a simplified block diagram illustrating a typical prior art network of computer systems and services.
Figure 2:
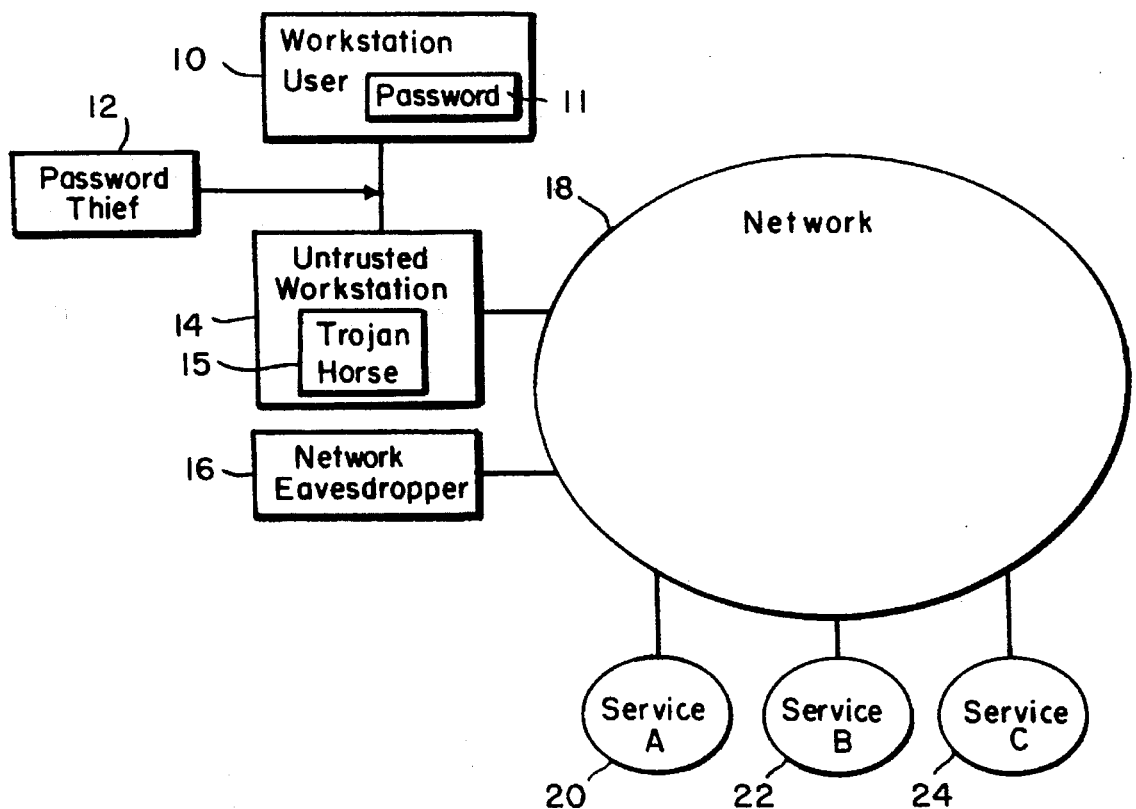
FIG. 2 is a simplified block diagram illustrating a typical prior art network of computer systems and services in a hostile environment.
Figure 3:
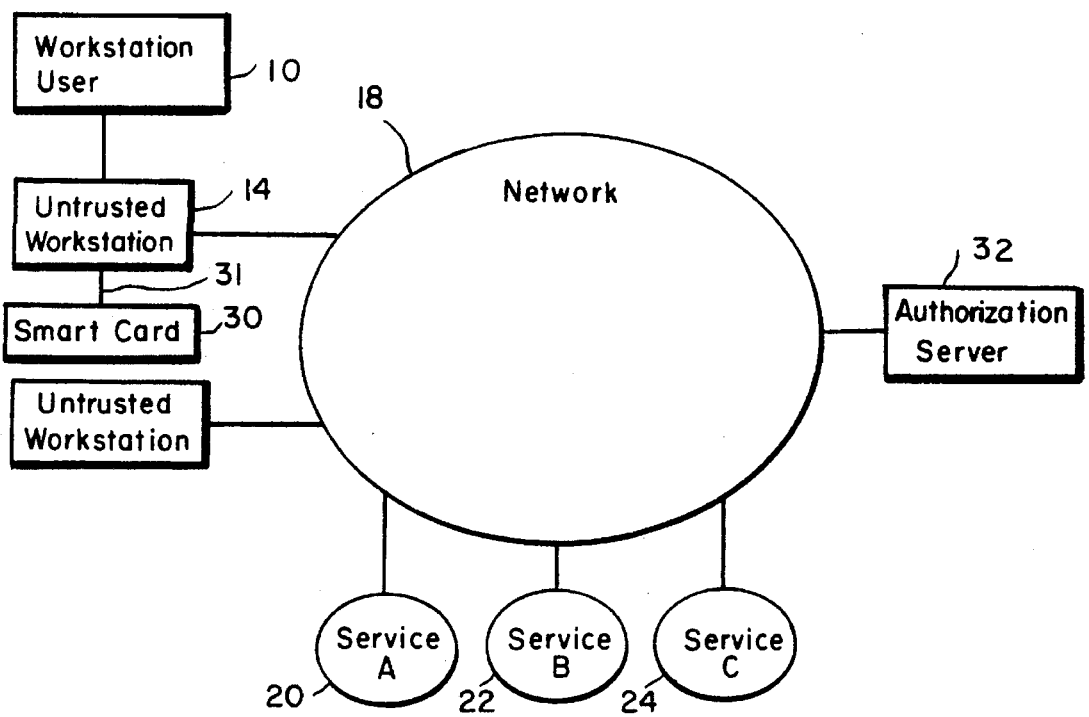
FIG. 3 is a simplified block diagram illustrating a typical network of computer systems and services augmented by the present invention.

With reference to FIG. 3., the system, according to the invention, for authentication of a user 10 to a variety of computer services 20, 22 and 24 on a network 18 of heterogenous computer systems is comprised of at least one user workstation 14 and one authorization server 32 connected to each other through a network 18. A user 10 couples a personally protectable coprocessor 30 to the workstation 14 by means of a bidirectional communication channel 31.

In connection with the authentication procedure, the smart card is initialized at the central authorization center. The smart card is programmed with the user key which is encrypted using a key derived from a user supplied password. The encrypted user key is stored in nonvolatile memory which is only readable by the smart card. The user key and user id are also stored in the central physically secure authentication server at this time. The card is now ready for use by the user.

Figure 5:
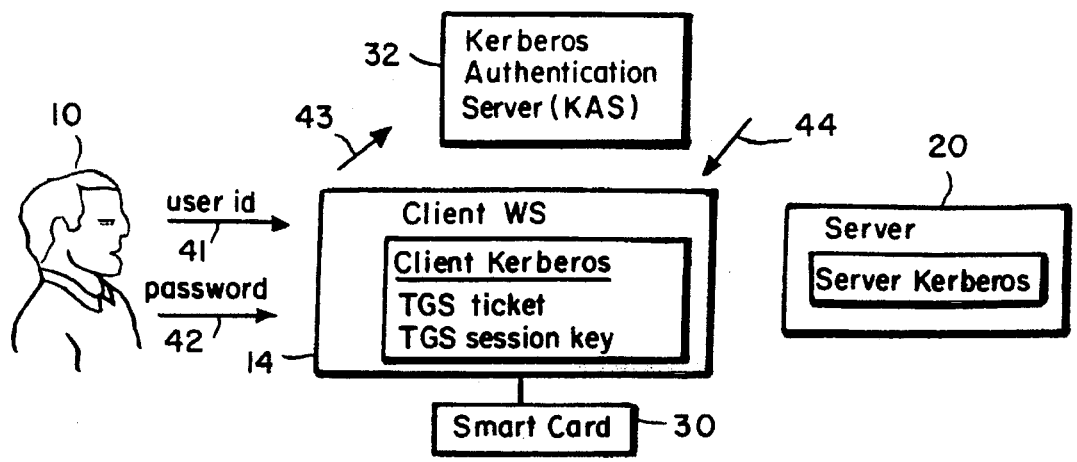
FIG. 5 is a simplified diagram of the system during the first phase of user authentication.

Following registration, user interaction with Kerberos consists of three phases. The first phase occurs during login as illustrated in FIG. 5. The user 10 first enters his user id 41 into the workstation 14 and sends a request 43 to the KAS 32. A ticket to the ticket granting service and its associated session key 44 are then generated by the KAS 32 and sent to the user's workstation 14, the session key being encrypted by the KAS 32 in a private key derived from the user's password. The user then enters a password 42 which is converted into a key and sent to the smart card 30. If the password derived key is correct, the session key is properly decrypted by the smart card 30. If the entered password is incorrect, the session key will not be decrypted.

Figure 4:
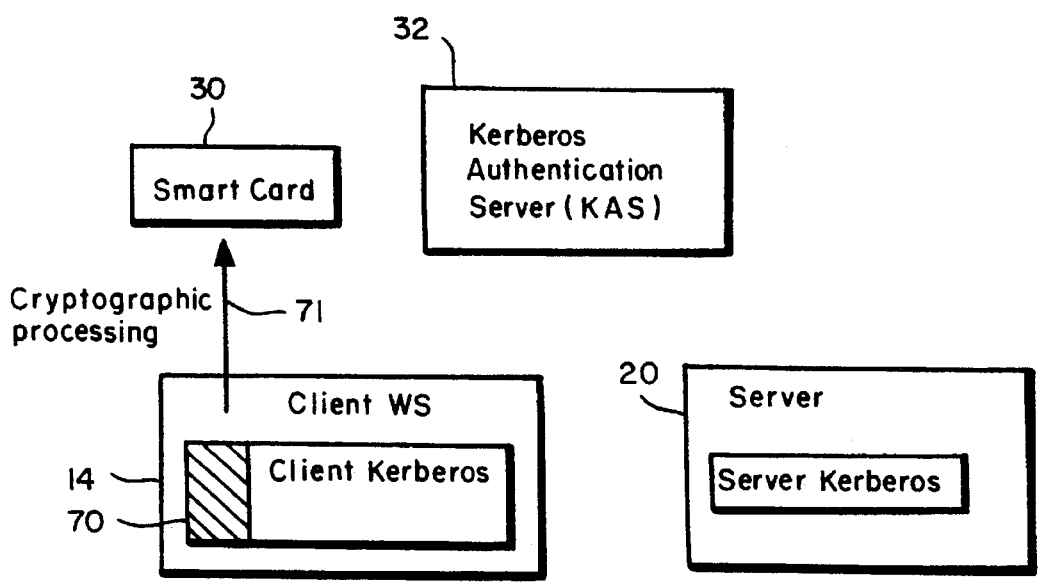
FIG. 4 is a simplified block diagram illustrating a Kerberos system augmented by the invention.
Figure 6:
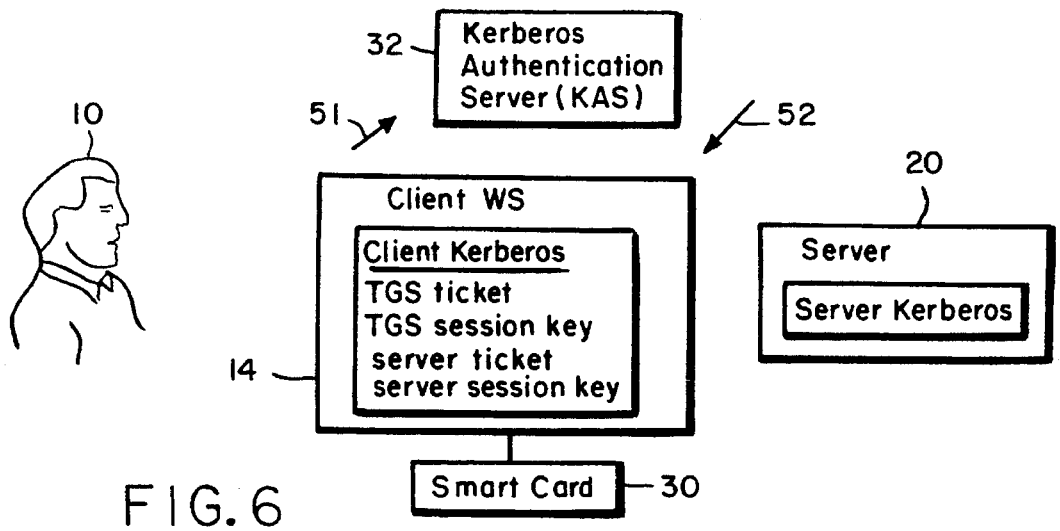
FIG. 6 is a simplified diagram of the system during the second phase of user authentication.
Figure 7:
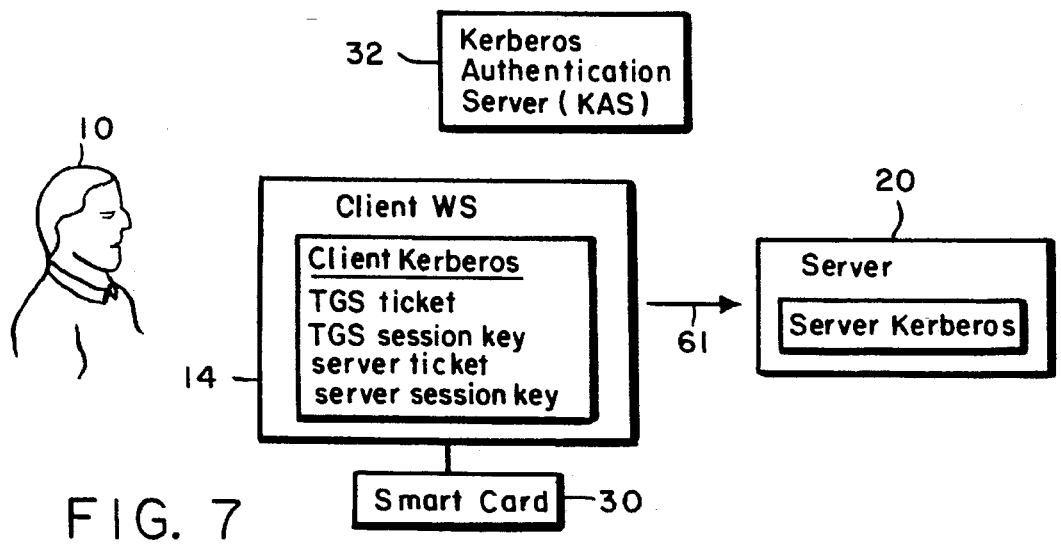
FIG. 7 is a simplified diagram of the system during the third phase of user authentication.

In the second phase as illustrated in FIG. 6, the user 10, desiring to access a specific system service 20, presents the ticket granting service ticket and an associated authenticator 51 to the ticket granting service running on the KAS 32 to request a ticket for the desired system service 20. The authenticator is encrypted by the smart card 30. The ticket and associated authenticator 51 identifies and authenticates the user 10 to the ticket granting service. The ticket granting service then generates and sends an appropriate server ticket and server session key 52 to the user's workstation, the server session key being encrypted in the session key associated with the ticket granting service. This encrypted session key is then decrypted within by the user's smart card 30. In the third phase illustrated in FIG. 7, the user's workstation 14 and smart card 30 encrypts an appropriate authenticator for the desired server ticket, the user then presents the server ticket and associated authenticator 61 to the service 20, and, following validation by the server, obtains access. As illustrated in FIG. 4, the smart card 30 augments client Kerberos 70 running on the user's untrusted workstation 14 by moving the cryptographic processing 71 into the smart card 30. All encryption and decryption required for access to the authorization server 32 or a network service 20 is done within the smart card 30. With greater detail, the smart card augmented Kerberos would function as follows:

| | |
|---|---|
| Initial State: | Client Kerberos holds no user-unique information. The smart card holds the user's private key encrypted in a key derived from a password. |
| Step 1: | The user inserts his/her smart card into the card reader attached to the workstation. Client Kerberos requests a user id. |
| Step 2: | Client Kerberos sends the user id to the KAS and prompts the user for a password. Client Kerberos derives a key from the password and sends it to the smart card. The smart card uses the password-derived key to decrypt the user's private key. |
| Step 3: | The KAS generates the user's ticket granting service (TGS) ticket and associated TGS session key, encrypts the TGS session key using the user's private key, and sends the message to the client. |
| Step 4: | Client Kerberos stores the TGS ticket and transfers the encrypted TGS session key to the smart card. |
| Step 5: | The smart card uses the user's private key to decrypt the encrypted session key. The smart card stores the TGS session key in its volatile memory, destroys the password-derived key and the decrypted copy of the user's private key, encrypts a copy of the TGS session key using the stored version of the TGS session key as the encrypting key, and transfers the encrypted copy back to client Kerberos. |
| Step 6: | To access a system service, client Kerberos first determines if a ticket to that service is needed (one may have been obtained earlier and, if so, the process jumps to step 12). If a ticket is needed, client Kerberos transfers identification information and a timestamp to the smart card, along with the encrypted TGS session key. |
| Step 7: | The smart card then creates an authenticator for the TGS service by decrypting the encrypted TGS session key and encrypting the identification information and timestamp using the decrypted TGS session key. It sends |

-continued

| | the encrypted authenticator back to client Kerberos. |
|---|---|
| Step 8: | Client Kerberos sends the service request, together with the TGS ticket and encrypted authenticator, to the KAS. |
| Step 9: | The KAS validates the request and, if valid generates the appropriate server ticket and associated server session key, encrypts the server session key using the requesting user's TGS session key, and sends the message to client Kerberos. |
| Step 10: | Client Kerberos transfers the portion of the message encrypted using the TGS session key to the smart card. |
| Step 11: | The smart card decrypts the message, re-encrypts the server session key using the TGS session key, and sends it back to client Kerberos. |
| Step 12: | Client Kerberos transfers the identification information, a timestamp, and the desired encrypted server session key to the smart card. |
| Step 13: | The smart card decrypts the encrypted server session key and encrypts the identification information and timestamp in the decrypted server session key. The smart card sends the encrypted authenticator to client Kerberos. |
| Step 14: | Client Kerberos sends the server ticket and encrypted authenticator to the requested service. |
| Step 15: | Server Kerberos decrypts the server ticket and authenticator and authenticates the user |

In addition to enhancing security, it is possible for the invention to maintain interoperability with existing authentication systems. For example, the invention allows smart card augmented Kerberos components to be gradually introduced into an operational environment as time and resources permit. This invention provides that neither the Kerberos authentication server (KAS) nor the server Kerberos implementations be affected in any way.

Smart cards are small credit card sized processing systems. A smart card typically contains a microcontroller (CPU), an amount of volatile random access memory (RAM), an amount of electrically erasable programmable read only memory (EEPROM), an interface to communicate outside of the card and an "operating system" residing in masked read only memory (ROM). Numerous vendors currently produce such cards, each with different CPU, RAM, EEPROM, ROM and programming characteristics. For a prototype of the present invention, the ΩmegaCard™ by Sota Electronics, Inc. was used.

Advances in encryption and smart card technology have reached the point where significant amounts of information can be stored and significant processing can be performed entirely within the isolated environment of the card itself. When this technology is combined with user-unique information (e.g., a password) that is useless except when processed by the appropriate smart card, a significantly stronger authentication mechanism can be constructed than is available with "standard" Kerberos. Kerberos itself has evolved to accommodate such augmentations.

With reference to Appendix A, the smart card is programmed to be an encryption service provider for the encryption of Kerberos authenticators and the decryption of Kerberos KAS/TGS responses. It implements the DES CBC mode, performing an encryption or decryption operation on 8 byte blocks of data using a DES key and an initialization vector. The software architecture of the smart card consists of the operating system, I/O routines, interface routines, the control application, and DES algorithm. The operating system and I/O routines are provided in the smart card development system. Assembler interface routines were modified to allow Archimedes version 4.0 C-8051 to make calls to the operating system to read messages into the smart card, write messages out of the smart card, and write bytes to EEPROM. Both the control application and the DES algorithm are written in C.

The control application implements the control protocol to communicate with client Kerberos and performs the requested encryption service on the input data. There are two additional functions in support of the encryption service: decrypting the user key for decryption of the first KAS message and downloading a session key for encryption of authenticators. The control protocol has been implemented such that each request message sent to or from the smart card has a corresponding response message (acknowledgment) returned before another message may be sent. This serves to keep the client Kerberos and the smart card message exchanges tightly coupled and helped in smart card software debugging. There are some smart card initialization procedures regarding card reset, card login, and execution of the control application. Once the smart card control application is running, all messages sent to the smart card are delivered to the control application.

In support of KAS/TGS response decryption, the following operations are performed. To process the initial KAS response, it is first necessary to decrypt the Kerberos user key (stored in encrypted form in EEPROM). To do this, client Kerberos sends a hash of the user password to the smart card to be used as a DES key. The smart card decrypts the user key using this hashed password key. Client Kerberos then sends the KAS response to the smart card, one block at a time in a Download Block message. The last block is sent in a Decrypt message, notifying the smart card to start the decryption process. The last block is sent in a Decrypt message, notifying the smart card to start the decryption process. The smart card assumes that the first response to be decrypted following initialization comes from the KAS. This response is encrypted in the user key and contains the TGS session key. Subsequent responses are assumed to come from the TGS. These responses are encrypted in the TGS session key and contain server session keys. Decrypted blocks are sent back in a Return message. The last decrypted block is sent back in an End message. All decrypted session keys are re-encrypted in the TGS session key before being sent back. The decrypted user key is destroyed after the first response is processed. Thereafter, the smart card uses the stored TGS session key for all decryptions.

For subsequent support of the TGS authenticator encryption, the following operations are performed. The appropriate session key is sent to the smart card in the Send Session Key message. The session key is decrypted with the TGS session key and stored in memory. Next, the TGS authenticator is sent down to the smart card one block at a time in a Download Block message. The last block is sent as an Encrypt message, notifying the smart card to start the encryption process. The TGS authenticator is then encrypted in the session key previously downloaded. As each block is encrypted, it is sent back to the client Kerberos in a Return message. The last block is sent in an End message.

Given that the smart card was not required to act as a bulk encryptor for message data streams, the implementation of the DES algorithm on the smart card was driven by memory constraints rather than encryption rate, with the understanding that higher encryption rates could be achieved by trading space for time. We chose a straightforward implementation of the DES algorithm as illustrated in Press, W. H., Flannery, B. P., Teulosky, S. A., and Vetterling, W. T., "Numerical Recipes: The Art of Scientific Computing," Cambridge University Press, Cambridge, UK, 1986, pp. 218–220. The DES algorithm is used for exemplary purposes only. One skilled in the art may substitute an alternate encryption algorithm.

While the Kerberos implementation is illustrated here, it should be clear to one trained in the art that the invention is not limited to Kerberos, but may also be used in conjunction with other authorization systems to provide a secure method to authenticate users.

APPENDIX A

Jan 25 18:29 1993 exdemo2.c Page 1

```c
/***********************************************************************/
/*                                                                     */
/* THIS IS THE SMART CARD MAIN PROGRAM WHICH WILL HANDLE               */
/* INTERFACING WITH THE MASKED ROM TO GET MESSAGES AND SEND            */
/* RESPONSES TO THE WORKSTATION. THIS PROGRAM ALSO PARSES THE          */
/* INCOMING MESSAGES AND CONTROLS THE SMART CARD DES PROCESSING        */
/*                                                                     */
/***********************************************************************/
/*

/* #define DEBUG */
/* #define DEBUG1 */ define INBUFF  0x33    /* assemble ramdef.inc to find address   */
define OUTBUFF 0x33    /* assemble ramdef.inc to find address   */

/* defines for memory locations for the INBUFF buffer */ define IO_MSG_SOH     (* (unsigned char *) 0x000033) /* Msg start of header */
define IO_MSG_LTH     (* (unsigned char *) 0x000034) /* Msg length in header */
#define IO_MSG_CMD     (* (unsigned char *) 0x000035) /* Msg command in header
#define IO_MSG_DATA    (* (unsigned char *) 0x000036) /* MAX 16B + CRC (2B)
#define IO_RAM_LO      (* (unsigned char *) 0x000036) /* Low order 8B of ms
define IO_RAM_HI      (* (unsigned char *) 0x000040) /* Hi order 8B after define EVER   ;;

/*                                                                     */
/***********************************************************************/
/*                                                                     */ include "c:\archimed\h\stdio.h"    /* required header for printf, putchar *
include "c:\archimed\h\io51.h"     /* required header for output, bit_set, etc. */
#include "c:\archimed\h\string.h"   /* new for strlen function */
#include "config.h"
#include "sio.h"
#include "ee_opt.h"
#include "regdef.h"
#include "crc16.h"
#include "cmdequ.h"
#include "card_des.h"

#pragma language=extended

/*
/***********************************************************************/
/*                                                                     */
/* External prototype declarations for asminf.msa assembly I/F routines */
/*                                                                     */

/* function to receive data into the smart card */
```

- 16 -

Jan 25 18:29 1993 exdemo2.c Page 2

```c
extern int receiveData();

/* function to copy count bytes from source to desti :ion in eeprom */
extern void c_byte_write(unsigned char count, unsign  char *source,
                                                unsigned char *dest);

/* function to copy a source pointer into destination eeprom pointer */
extern void copy_ptr_to_EE(unsigned char *source, unsigned char **dest);

/* function to transmit count bytes from the buffer out of the smart card
   using the command code provided */
extern void TxRamBuffer(unsigned char count, unsigned char command);

/* function to take the bytes_to_steal from the stack to use as memory
   available for the smart card */
extern void StealStack(unsigned char bytes_to_steal);

/*                                                                        */
/**************************************************************************/
/*                                                                        */
/*   External prototype declaration for des.c function                    */
/*                                                                        */

/* function to perform des encryption or decryption */
extern void des(bit isw); /* isw == 0 => encrypt, isw == 1 => decrypt */

/*                                                                        */
/**************************************************************************/
/*                                                                        */ pragma memory=xdataconst
pragma stringalloc=xdata

/* user key encrypted in hashed password */ const unsigned char user_key_encr[]={ 0x01, 0x01, 0x01, 0x01,
                                      0x01, 0x01, 0x01, 0x01 };

#pragma memory=default
#pragma stringalloc=default

/*
/**************************************************************************
/*                                                                        */
/*   DES pointer global declarations                                      */
/*                                                                        */ xdata immense *inp; /* Pointer to 8 byte block holding DES input.
                       Can point to RAM or EEPROM */
xdata immense *key; /* Pointer to 8 byte block holding DES key.  Can
                       point to RAM or EEPROM, but should be RAM to
                       preserve security. */
```

- 17 -

Jan 25 18:29 1993  exdemo2.c Page 3

```c
xdata immense *out; /* Pointer to 8 byte block to receive DES output.
                       Must point to RAM */

/*                                                                          */
/****************************************************************************/
/*                                                                          */
/* Working storage area for processing Authentication Server response       */
/* message sent by client for decryption.                                   */
/*                                                                          */ union des_block {
  immense     i;
  unsigned char b[8];
};                              /* DES block that we can work with
                                   either as 4 or 1 bytes components. */
#define AS_RESP_SIZE    35      /* Maximum number of 8-byte chunks we
                                   can handle in any one message */
xdata union des_block as_resp[AS_RESP_SIZE+1];
                                /* Response message buffer, plus 1
                                   block for the CBC IV */
xdata union des_block sk_buf[2];     /* Temp storage for decrypted response
                                   blocks that hold the session key */
xdata immense hp_IV;            /* User's hashed password acting as
                                   the DES CBC IV for the KAS response
                                   message. */
xdata union des_block tgs_sk_ram;
                                /* tgs session key storage location.
                                   Yes, I know it says RAM and it
                                   should be in RAM, but there's just
                                   no room for it. */
BIT got_TGS_SK;                 /* Indicates if we've got the TGS SK
                                   decrypted in RAM */

/*                                                                          */
/****************************************************************************/
/*                                                                          */
/* main()                                                                   */
/*                                                                          */ void main(void)    /* Main EXAMPLE.C program */
{
        /* local variable declarations */ idata unsigned char resp_blk_cnt;
                                /* Count of response message blocks received */
        idata unsigned char resp_blk_indx;
                                /* Index into current response message
                                   block being processed */
        idata union des_block sk_ram_buf;
                                /* Temp storage for red session key
                                   from response message */

/* Steal bytes from the stack to use as working storage. */
```

```
                                    - 18 -

Jan 25 18:29 1993 exdemo2.c Page 4

StealStack(9);

resp_blk_cnt = 1;
            got_TGS_SK = 0;
/*                                                                          */
/****************************************************************************/
/*                                                                          */
/*  LOOP HERE FOREVER TO PERFORM SMART CARD OPERATIONS                      */
/*                                                                          */ for (EVER)
              {
                /* READ A MESSAGE */
                receiveData();

/* PROCESS MESSAGE AND SEND RESPONSE */ switch( IO_MSG_CMD )
                  {
                    case CMD_SND_HPW:

/* move *key to point to hashed password in received buffer */
                       copy_ptr_to_EE(&IO_RAM_LO, (unsigned char **) &key);

/* move *inp to point to the user_key_encr in card */
                       copy_ptr_to_EE(user_key_encr, (unsigned char **) &inp);

/* move *out to point to the output buffer */
                       copy_ptr_to_EE(&IO_RAM_HI, (unsigned char **) &out);

/* call des and decrypt the user key with the hashed pw */
                       des(1);
                       got_TGS_SK = 0; /* Act like we don't have a TGS SK yet */ ifdef DEBUG
                       /* copy uk output to the transmit buffer and send out */
                       key->l = out->l;
                       key->r = out->r;

/* send a CMD_ACK_HPW back with 8 bytes of data */
                       TxRamBuffer((unsigned char) 8, (unsigned char) CMD_ACK_HPW );
else /* send a CMD_ACK_HPW back with no data */
                       TxRamBuffer((unsigned char) 0, (unsigned char) CMD_ACK_HPW );
#endif
                       /* Put red user key into TGS SK buffer for use in
                          decrypting the TGT response message */
                       c_byte_write((unsigned char ) 8, (unsigned char *) out,
                                    (unsigned char *) &tgs_sk_ram);
                       break;
```

- 19 -

Jan 25 18:29 1993  exdemo2.c Page 5

```c
        case CMD_SND_ENC_PART:
                        /* Store the next block of the
                           encrypted part of a message. Note,
                           that this may need to be encrypted
                           before transmission, or decrypted
                           after reception.*/ if (resp_blk_cnt < AS_RESP_SIZE) {
              c_byte_write((unsigned char) 8, &IO_RAM_LO,
                           (unsigned char *) &as_resp[resp_blk_cnt]);
              resp_blk_cnt++;
              TxRamBuffer((unsigned char) 0,
                          (unsigned char) CMD_ACK_SND_ENC_PART);
            } else {
              TxRamBuffer((unsigned char) 0, (unsigned char) CMD_UNKNOWN);
              resp_blk_cnt = 1; /* Discard overflowing message */
            }
            break;

case CMD_SND_DECR:
                        /* Received a complete authentication
                           server response message. Decrypt
                           it, then return it with the session k-
                           encrypted with the TGS SK. Flag
                           got_TGS_SK reset implies this is a TGS
                           session key message */ c_byte_write((unsigned char) 8, &IO_RAM_LO,
                         (unsigned char *) &as_resp[resp_blk_cnt]);
            TxRamBuffer((unsigned char) 0,
                        (unsigned char) CMD_ACK_SND_DECR);
            copy_ptr_to_EE((unsigned char *) &tgs_sk_ram,
                           (unsigned char **) &key);
            copy_ptr_to_EE((unsigned char *) &IO_RAM_LO,
                           (unsigned char **) &out);
            for (resp_blk_indx=1; resp_blk_indx <= resp_blk_cnt;
                 resp_blk_indx++) {
              copy_ptr_to_EE((unsigned char *) &as_resp[resp_blk_indx],
                             (unsigned char **) &inp);

des(1);

out->l ^= (resp_blk_indx > 1)
                        ? as_resp[resp_blk_indx-1].i.l : tgs_sk_ram.i.l;
              out->r ^= (resp_blk_indx > 1)
                        ? as_resp[resp_blk_indx-1].i.r : tgs_sk_ram.i.r;

if (resp_blk_indx == 4) {
                /* This block contains the first byte of the red
                   session key per Kerberos V5 message spec.
                   Stash away that byte in RAM and store the rest
                   of the harmless decrypted response block in EE
```

Jan 25 18:29 1993 exdemo2.c Page 6

```
                for later xmission to the client. */ sk_ram_buf.b[0] = ((union des_block *) &IO_RAM_LO)->b[7];
        ((union des_block *) &IO_RAM_LO)->b[7] = 0;
        c_byte_write((unsigned char) 8, & IO_RAM_LO,
                    (unsigned char *) &sk_buf[0]);

} else if (resp_blk_indx ==5) {
        /* We now have the rest of the red session key
           from the response message. Collect the
           complete red session key in RAM, clear it from
           the response block buffer, and store the
           harmless response block for later xmission. */ sk_ram_buf.b[1] = ((union des_block *) &IO_RAM_LO)->b[0];
        sk_ram_buf.b[2] = ((union des_block *) &IO_RAM_LO)->b[1];
        sk_ram_buf.b[3] = ((union des_block *) &IO_RAM_LO)->b[2];
        sk_ram_buf.b[4] = ((union des_block *) &IO_RAM_LO)->b[3];
        sk_ram_buf.b[5] = ((union des_block *) &IO_RAM_LO)->b[4];
        sk_ram_buf.b[6] = ((union des_block *) &IO_RAM_LO)->b[5];
        sk_ram_buf.b[7] = ((union des_block *) &IO_RAM_LO)->b[6];
        ((union des_block *) &IO_RAM_LO)->i.l = 0l;
        ((union des_block *) &IO_RAM_LO)->b[4] = 0;
        ((union des_block *) &IO_RAM_LO)->b[5] = 0;
        ((union des_block *) &IO_RAM_LO)->b[6] = 0;
        c_byte_write((unsigned char) 8, & IO_RAM_LO,
                    (unsigned char *) &sk_buf[1]);

/* Now encrypt the red session key with the TGS
           SK. If we are processing the TGT response then
           the red session key in sk_ram_buf IS the TGS
           SK. In this case encrypt it with itself as
           key. */
        copy_ptr_to_EE((unsigned char *) &sk_ram_buf,
                    (unsigned char **) &inp);
        if (! got_TGS_SK)
            copy_ptr_to_EE((unsigned char *) &sk_ram_buf,
                    (unsigned char **) &key);
        des(0);
        if (! got_TGS_SK)
            copy_ptr_to_EE((unsigned char *) &tgs_sk_ram,
                    (unsigned char **) &key);
        ((immense *) &IO_RAM_HI)->l = ((immense *) &IO_RAM_LO)->l;
        ((immense *) &IO_RAM_HI)->r = ((immense *) &IO_RAM_LO)->r;
        ((immense *) &IO_RAM_LO)->l = sk_buf[0].i.l;
        ((immense *) &IO_RAM_LO)->r = sk_buf[0].i.r;
        ((union des_block *) &IO_RAM_LO)->b[7] =
            ((union des_block *) &IO_RAM_HI)->b[0];
        TxRamBuffer((unsigned char) 8,
                    (unsigned char) CMD_RTN_ENC_PART);
        receiveData();
        if (IO_MSG_CMD != CMD_ACK_RTN_ENC_PART)
            break;    /* Discard response message and wait
```

- 21 -

Jan 25 18:29 1993 exdemo2.c Page 7

```
                            for next input from client. */
            ((union des_block *) &IO_RAM_LO)->b[0] =
                ((union des_block *) &IO_RAM_HI)->b[1];
            ((union des_block *) &IO_RAM_LO)->b[1] =
                ((union des_block *) &IO_RAM_HI)->b[2];
            ((union des_block *) &IO_RAM_LO)->b[2] =
                ((union des_block *) &IO_RAM_HI)->b[3];
            ((union des_block *) &IO_RAM_LO)->b[3] =
                ((union des_block *) &IO_RAM_HI)->b[4];
            ((union des_block *) &IO_RAM_LO)->b[4] =
                ((union des_block *) &IO_RAM_HI)->b[5];
            ((union des_block *) &IO_RAM_LO)->b[5] =
                ((union des_block *) &IO_RAM_HI)->b[6];
            ((union des_block *) &IO_RAM_LO)->b[6] =
                ((union des_block *) &IO_RAM_HI)->b[7];
            ((union des_block *) &IO_RAM_LO)->b[7] = sk_buf[1].b[7];
            TxRamBuffer((unsigned char) 8,
                        (unsigned char) CMD_RTN_ENC_PART);
            receiveData();
            if (IO_MSG_CMD != CMD_ACK_RTN_ENC_PART)
                break;    /* Discard response message and wait
                             for next input from client. */

} else {
          /* Not one of the message blocks containing a
             session key. */
          TxRamBuffer((unsigned char) 8,
                      (resp_blk_indx < resp_blk_cnt)
                      ? (unsigned char) CMD_RTN_ENC_PART
                      : (unsigned char) CMD_RTN_END);
          receiveData();
          if (IO_MSG_CMD != CMD_ACK_RTN_ENC_PART &&
              IO_MSG_CMD != CMD_ACK_RTN_END)
              break;    /* Discard response message and wait
                           for next input from client. */
        }
      }           /* end for loop */
      if (! got_TGS_SK) {
        /* We just got the red TGS SK in sk_ram_buf. Move
           it to its permanent ram buffer and remember that
           we have it. */
        c_byte_write((unsigned char) 8,
                     (unsigned char *) &sk_ram_buf,
                     (unsigned char *) &tgs_sk_ram);
        got_TGS_SK = 1;
        /* Now zero out hp_IV so that anyone stealing the
           card doesn't get the user's hashed password at
           the same time. */
      }
      resp_blk_cnt = 1;  /* Clear response message buffer */
      break;

case CMD_SND_KEY:
```

Jan 25 15:29 1993 exdemo2.c Page 8

```c
            /* move *key to point to TGSsk in tgs_sk_ram */
            copy_ptr_to_EE((unsigned char *) &tgs_sk_ram,
                        (unsigned char **) &key);

/* move *inp to point to the (sk)TGSsk in buffer low */
            copy_ptr_to_EE(&IO_RAM_LO, (unsigned char **) &inp);

/* move *out to point to the buffer high */
            copy_ptr_to_EE(&IO_RAM_HI, (unsigned char **) &out);

/* call des and decrypt the (sk)TGSsk with the TGSsk */
            des(1);

/* send a CMD_ACK_KEY back with no data */
            TxRamBuffer((unsigned char) 0, (unsigned char) CMD_ACK_KEY );

break;

case CMD_SND_ENCR:
                        /* Received a complete authenticator.
                           Encrypt it in the last key sent
                           down. */ c_byte_write((unsigned char) 8, &IO_RAM_LO,
                        (unsigned char *) &as_resp[resp_blk_cnt]);
            TxRamBuffer((unsigned char) 0,
                        (unsigned char) CMD_ACK_SND_ENCR);
            /* move *key to point to sk in buffer high */
            copy_ptr_to_EE(&IO_RAM_HI, (unsigned char **) &key);
            copy_ptr_to_EE((unsigned char *) &IO_RAM_LO,
                        (unsigned char **) &inp);
            /* Setting the DES output area to be the same as the
               input area is safe because the algorithm is
               finished reading the input before it first destroys
               the output area. But, beware if the DES algorithm changes.*/
            copy_ptr_to_EE((unsigned char *) &IO_RAM_LO,
                        (unsigned char **) &out);
            for (resp_blk_indx=1; resp_blk_indx <= resp_blk_cnt;
                resp_blk_indx++) { inp->l = as_resp[resp_blk_indx].i.l
                        ^ ((resp_blk_indx > 1)
                            ? bp_IV.l
                            : key->l);
                inp->r = as_resp[resp_blk_indx].i.r
                        ^ ((resp_blk_indx > 1)
                            ? bp_IV.r
                            : key->r);

des(0);
                c_byte_write((unsigned char) 8,
```

- 23 -

Jan 25 18:29 1993 exdemo2.c Page 9

```
                            (unsigned char *) &IO_RAM_LO,
                            (unsigned char *) &hp_IV);

TxRamBuffer((unsigned char) 8,
                        (resp_blk_indx < resp_blk_cnt)
                            ? (unsigned char) CMD_RTN_ENC_PART
                            : (unsigned char) CMD_RTN_END);
            receiveData();
            if (IO_MSG_CMD != CMD_ACK_RTN_ENC_PART &&
                IO_MSG_CMD != CMD_ACK_RTN_END)
                break;      /* Discard response message and wait
                               for next input from client. */
            }               /* end for loop */
                            /* Uses whichever session key was sent
                               in the last CMD_SND_KEY message */
            resp_blk_cnt = 1; /* Clear response message buffer */
            break;

case CMD_SND_HELLO:

/* send a CMD_ACK_HELLO back with no data */
            TxRamBuffer((unsigned char) 0, (unsigned char) CMD_ACK_HELLO);

break;

default:

/* send a CMD_UNKNOWN back with no data */
            TxRamBuffer((unsigned char) 0, (unsigned char) CMD_UNKNOWN);

} /* end switch */
    } /* end for */
} /* end main */
```

- 24 -

Jan 25 18:22 1993 des.c Page 1

```c
#include "card_des.h"

#ifdef CARD
#pragma memory=xdataconst
pragma stringalloc=xdata
endif const unsigned long bit_pos[33]=
        {0, 0x80000000L, 0x40000000L, 0x20000000L, 0x10000000L,
            0x8000000L,  0x4000000L,  0x2000000L,  0x1000000L,
            0x800000L,   0x400000L,   0x200000L,   0x100000L,
            0x80000L,    0x40000L,    0x20000L,    0x10000L,
            0x8000L,     0x4000L,     0x2000L,     0x1000L,
            0x800L,      0x400L,      0x200L,      0x100L,
            0x80L,       0x40L,       0x20L,       0x10L,
            0x8L,        0x4L,        0x2L,        0x1L
        };
static const char ip[65]=
        {0,58,50,42,34,26,18,10,2,60,52,44,36,
         28,20,12,4,62,54,46,38,30,22,14,6,64,56,48,40,
         32,24,16,8,57,49,41,33,25,17,9,1,59,51,43,35,
         27,19,11,3,61,53,45,37,29,21,13,5,63,55,47,39,
         31,23,15,7};
static const char ipm[65]=
        {0,40,8,48,16,56,24,64,32,39,7,47,15,
         55,23,63,31,38,6,46,14,54,22,62,30,37,5,45,13,
         53,21,61,29,36,4,44,12,52,20,60,28,35,3,43,11,
         51,19,59,27,34,2,42,10,50,18,58,26,33,1,41,9,
         49,17,57,25};

#ifdef CARD
#pragma memory=default
#pragma stringalloc=default
endif immense itemp1;
extern xdata immense    *inp;
extern xdata immense    *key;
extern xdata immense    *out;
extern xdata great      ks_sub_n, ie;
extern xdata unsigned long      ietmp2;

void
#ifdef CARD
des(BIT isw)
#else
des(isw)
        BIT isw;
#endif
{
        idata unsigned char loop_ctr;
#ifdef CARD
        void ks(unsigned char n, BIT isw);
```

- 25 -

Jan 25 18:22 1993 des.c Page 2

```
        void c_byte_write(data unsigned char count,
                          data unsigned char *source,
                          data unsigned char *dest);
#else
        void ks();
        void c_byte_write();
#endif
        void prep_key();
        void cyfun();

itempl.r = itempl.l = 0L;
        for(loop_ctr=1; loop_ctr<=32; loop_ctr++) {
                itempl.r = (itempl.r << 1) | getbit(*inp,ip[loop_ctr+32],32);
                itempl.l = (itempl.l << 1) | getbit(*inp,ip[loop_ctr],32);
        }
        prep_key();
        for(loop_ctr=1; loop_ctr<=16; loop_ctr++) {
                ks((unsigned char) (isw ? 17-loop_ctr : loop_ctr), isw);
                cyfun();
                out->l ^= itempl.l;
                itempl.l=itempl.r;
                itempl.r=out->l;
        }
        out->l=itempl.r;
        itempl.r=itempl.l;
        itempl.l=out->l;
        out->r = out->l = 0L;
        for(loop_ctr=1; loop_ctr<=32; loop_ctr++) {
                out->r = (out->r << 1) | getbit(itempl,ipm[loop_ctr+32],32);
                out->l = (out->l << 1) | getbit(itempl,ipm[loop_ctr],32);
        }
        /* Zero out the EEPROM areas holding security relevant data. */
        itempl.r = itempl.l = 0L;
        c_byte_write(6, (unsigned char *) &itempl,
                        (unsigned char *) &ks_sub_n);
        c_byte_write(6, (unsigned char *) &itempl, (unsigned char *) &ie);
        c_byte_write(4, (unsigned char *) &itempl, (unsigned char *) &ietmp2);
}
```

- 26 -

```
Jan 25 18:22 1993  desks.c Page 1 include "card_des.h"

:def CARD
#:ragma memory=xdataconst
#pragma stringalloc=xdata
endif extern const unsigned long bit_pos[];   /* defined in des.c */
static const char ipc1[57]={0,57,49,41,33,25,17,9,1,58,50,
              42,34,26,18,10,2,59,51,43,35,27,19,11,3,60,
              52,44,36,63,55,47,39,31,23,15,7,62,54,46,38,
              30,22,14,6,61,53,45,37,29,21,13,5,28,20,12,4};
static const char ipc2[49]={0,14,17,11,24,1,5,3,28,15,6,21,
              10,23,19,12,4,26,8,16,7,27,20,13,2,41,52,31,
              37,47,55,30,40,51,45,33,48,44,49,39,56,34,
              53,46,42,50,36,29,32};

#ifdef CARD
#pragma memory=default
#pragma stringalloc=default
endif static immense icd;
xdata union {
  great s;
  unsigned char b[6];
} ks_sub_n, ie;
xdata union {
  unsigned long l;
  unsigned char b[4];
} ietmp2;

extern immense itempl;
extern xdata immense    *inp;
extern xdata immense    *key;
extern xdata immense    *out;

#ifndef CARD
void
c_byte_write(count, source, dest)
     unsigned char    count;
     unsigned char    *source, *dest;
{
  idata unsigned char   index;

for (index=0; index<count; index++) *dest++ = *source++;
}
#else
extern void c_byte_write(data unsigned char count,
                         data unsigned char *source,
                         data unsigned char *dest);
#endif
```

- 27 -

```
Jan 25 18:22 1993  desks.c Page 2 void
prep_key()
{
  idata unsigned char loop_ctr;

icd.r = icd.l = 0L;
  for(loop_ctr=1; loop_ctr<=28; loop_ctr++) {
    icd.r = (icd.r << 1) | getbit(*key,ipc1[loop_ctr+28],32);
    icd.l = (icd.l << 1) | getbit(*key,ipc1[loop_ctr],32);
  }
  icd.r <<= 4;
  icd.l <<= 4;
} ifdef CARD
void ks(data unsigned char n, BIT isw)
#else
void ks(n, isw)
     unsigned char n;
     BIT isw;
#endif
{
        idata unsigned char    ks_buff;
        if (isw) {
                              /* Do decrypt key schedule */
          if (n < 16) {
            icd.r = (icd.r << 27) | ((icd.r >> 1) & 0x7ffffff0L);
            icd.l = (icd.l << 27) | ((icd.l >> 1) & 0x7ffffff0L);
            if (n != 1 && n != 8 && n != 15) {
              icd.r = (icd.r << 27) | ((icd.r >> 1) & 0x7ffffff0L);
              icd.l = (icd.l << 27) | ((icd.l >> 1) & 0x7ffffff0L);
            }
          }
        }
        else {                /* Do encrypt key schedule */
          icd.r = (icd.r << 1) | ((icd.r >> 27) & 16L);
          icd.l = (icd.l << 1) | ((icd.l >> 27) & 16L);
          if (n != 1 && n != 2 && n != 9 && n != 16) {
            icd.r = (icd.r << 1) | ((icd.r >> 27) & 16L);
            icd.l = (icd.l << 1) | ((icd.l >> 27) & 16L);
          }
        }
        ks_buff = 0;
        for (n=1; n<=48; n++) {
          ks_buff = (ks_buff << 1) | (unsigned char) getbit(icd,ipc2[n],28);
          if (n%8 == 0) {
            c_byte_write(1, &ks_buff, &ks_sub_n.b[(n-1)/8]);
            ks_buff = 0;
          }
        }
} ifdef CARD
```

- 28 -

Jan 25 18:22 1993  desks.c Page 3

```
#pragma memory=xdataconst
pragma stringalloc=xdata
endif static const char iet[49]={0,32,1,2,3,4,5,4,5,6,7,8,9,8,9,
           10,11,12,13,12,13,14,15,16,17,16,17,18,19,
           20,21,20,21,22,23,24,25,24,25,26,27,28,29,
           28,29,30,31,32,1};
static const char ipp[33]={0,16,7,20,21,29,12,28,17,1,15,
           23,26,5,18,31,10,2,8,24,14,32,27,3,9,19,13,
           30,6,22,11,4,25};
static const char is[16][4][9]={
           0,14,15,10,7,2,12,4,13,0,0,3,13,13,14,10,13,1,
           0,4,0,13,10,4,9,1,7,0,15,13,1,3,11,4,6,2,
           0,4,1,0,13,12,1,11,2,0,15,13,7,8,11,15,0,15,
           0,1,14,6,6,2,14,4,11,0,12,8,10,15,8,3,11,1,
           0,13,8,9,14,4,10,2,8,0,7,4,0,11,2,4,11,13,
           0,14,7,4,9,1,15,11,4,0,8,10,13,0,12,2,13,14,
           0,1,14,14,3,1,15,14,4,0,4,7,9,5,12,2,7,8,
           0,8,11,9,0,11,5,13,1,0,2,1,0,6,7,12,8,7,
           0,2,6,6,0,7,9,15,6,0,14,15,3,6,4,7,4,10,
           0,13,10,8,12,10,2,12,9,0,4,3,6,10,1,9,1,4,
           0,15,11,3,6,10,2,0,15,0,2,2,4,15,7,12,9,3,
           0,6,4,15,11,13,8,3,12,0,9,15,9,1,14,5,4,10,
           0,11,3,15,9,11,6,8,11,0,13,8,6,0,13,9,1,7,
           0,2,13,3,7,7,12,7,14,0,1,4,8,13,2,15,10,8,
           0,8,4,5,10,6,8,13,1,0,1,14,10,3,1,5,10,4,
           0,11,1,0,13,8,3,14,2,0,7,2,7,8,13,10,7,13,
           0,3,9,1,1,8,0,3,10,0,10,12,2,4,5,6,14,12,
           0,15,5,11,15,15,7,10,0,0,5,11,4,9,6,11,9,15,
           0,10,7,13,2,5,13,12,9,0,6,0,8,7,0,1,3,5,
           0,12,8,1,1,9,0,15,6,0,11,6,15,4,15,14,5,12,
           0,6,2,12,8,3,3,9,3,0,12,1,5,2,15,13,5,6,
           0,9,12,2,3,12,4,6,10,0,3,7,14,5,0,1,0,9,
           0,12,13,7,5,15,4,7,14,0,11,10,14,12,10,14,12,11,
           0,7,6,12,14,5,10,8,13,0,14,12,3,11,9,7,15,0,
           0,5,12,11,11,13,14,5,5,0,9,6,12,1,3,0,2,0,
           0,3,9,5,5,6,1,0,15,0,10,0,11,12,10,6,14,3,
           0,9,0,4,12,0,7,10,0,0,5,9,11,10,9,11,15,14,
           0,10,3,10,2,3,13,5,3,0,0,5,5,7,4,0,2,5,
           0,0,5,2,4,14,5,6,12,0,3,11,15,14,8,3,8,9,
           0,5,2,14,8,0,11,9,5,0,6,14,2,2,5,8,3,6,
           0,7,10,8,15,9,11,1,7,0,8,5,1,9,6,8,6,2,
           0,0,15,7,4,14,6,2,8,0,13,9,12,14,3,13,12,11};

#ifdef CARD
#pragma memory=default
#pragma stringalloc=default
endif void
cyfun()
{
```

```
Jan 25 18:22 1993  desks.c Page 4 idata unsigned char loop_ctr, j;

j = 0;
          for (loop_ctr=1; loop_ctr<=48; loop_ctr++) {
            j = (j << 1)
                | (unsigned char) (bit_pos[iet[loop_ctr]] & itempl.r ? 1 : 0);
            if (loop_ctr%8 == 0) {
              c_byte_write(1, &j, &ie.b[(loop_ctr-1)/8]);
              j = 0;
            }
          }
          for (loop_ctr=0; loop_ctr<6; loop_ctr++) {
            j = ie.b[loop_ctr] ^ ks_sub_n.b[loop_ctr];
            c_byte_write(1, &j, &ie.b[loop_ctr]);
          }
          out->l = (((unsigned long) (ie.s.c & 0xff)) << 18)
                 +((unsigned long) ie.s.r << 2);
          out->r = ((unsigned long) ie.s.l << 10)+((unsigned long) ie.s.c >> 6);
          c_byte_write(4, (unsigned char *) &out->r, (unsigned char *) &ietmp2);
          out->r = 0L;
          for(loop_ctr=1; loop_ctr<=8; loop_ctr++) {
            if(loop_ctr > 4)
              j = ((out->l <<= 6) >> 26) & 0x3f;
            else {
              j = (ietmp2.b[0] << 6) | (ietmp2.b[1] >> 2);
              c_byte_write(1, &j, &ietmp2.b[0]);
              j = (ietmp2.b[1] << 6) | (ietmp2.b[2] >> 2);
              c_byte_write(1, &j, &ietmp2.b[1]);
              j = (ietmp2.b[2] << 6) | (ietmp2.b[3] >> 2);
              c_byte_write(1, &j, &ietmp2.b[2]);
              j = ietmp2.b[3] << 6;
              c_byte_write(1, &j, &ietmp2.b[3]);
              j = (ietmp2.l >> 26) & 0x3f;
            }
            out->r = (out->r << 4) |
                     is[((j & 0x1e) >> 1]
                       [((j & 0x20) >> 4)+(j & 0x1)]
                       [loop_ctr];
          }
          out->l=0L;
          for(loop_ctr=1; loop_ctr<=32; loop_ctr++)
                  out->l = (out->l << 1)
                         | (bit_pos[ipp[loop_ctr]] & out->r ? 1 : 0);
        }
```

- 30 -

```
Jan 25 18:32 1993 asminf.msa Page 1

TITL'C INTERFACE ROUTINES '
        EXTERN  _R
        EXTERN  WRTCARD
        EXTERN  RDCARD
;       extern  BYTE_WRITE
$RAMDEF.INC
$SIO.INC
$MASKROM.INC
PAGE
;       NAME    asminf(16)
        RSEG    CODE(0)
;       PUBLIC  TxRAMData
;       $DEFFN  TxRAMData(0,0,0,0,5,0,0,0)
        PUBLIC  receiveData
        $DEFFN  receiveData(0,0,0,0,0,0,0,0)
;       PUBLIC  txEEData
;       $DEFFN  txEEData(0,0,0,0,4,0,0,0)
        PUBLIC  c_byte_write
        $DEFFN  c_byte_write(0,0,0,0,7,0,0,0)
        PUBLIC  copy_ptr_to_EE
        $DEFFN  copy_ptr_to_EE(0,0,0,0,6,0,0,0)
        PUBLIC  TxRamBuffer
        $DEFFN  TxRamBuffer(0,0,0,0,2,0,0,0)
;       PUBLIC  SetTimr0Hdlr
;       $DEFFN  SetTimr0Hdlr(0,0,0,0,0,0,0,0)
        PUBLIC  StealStack
        $DEFFN  StealStack(0,0,0,0,1,0,0,0)
        RSEG    CODE
; 1.   /*--------------------------------------------------------*/
; 2.   /*                                                        */
; 3.   /*    THIS IS AN EXAMPLE PROGRAM WHICH WILL DEMONSTRATE   */
; 4.   /*    HOW TO GENERATE A C PROGRAM AND ALSO HOW TO COMMUNICATE */
; 5.   /*    WITH THE MASK ROM OF THE OMEGA CARD.                */
; 6.   /*                                                        */
; 7.   /*    THIS DEMONSTRATION PROGRAM WILL FIRST OUTPUT A MESSAGE, */
; 8.   /*    "HELLO RS", AND THEN ECHO A RECEIVED MESSAGE BACK   */
; 9.   /*    TO A TRANSMITTER.                                   */
; 10.  /*                                                        */
; 11.  /*--------------------------------------------------------*/
; 12.
; 13.  int txEEData(char *message, char command)
; 14.  {
;txEEData:
;       MOV     $LOCBD txEEData+2,R7
;       MOV     $LOCBD txEEData+1,R6
;       MOV     $LOCBD txEEData,R5
; 15.
;
;       C INTERFACE ROUTINE TO TRANSMIT A BUFFER, CONTAINED IN EE MEMORY.
;       MEMORY MODEL IS SMALL.
;
;       INTERFACE:
;               char count = txEEData(char *message, char command)
```

- 31 -

Jan 25 18:32 1993 asminf.msa Page 2

```
;       NOTES:
;               AT ENTRY R2 AND R3 CONTAIN THE ADDRESS OF
;               THE BUFFER TO TRANSMIT TO.
;
;               AT EXIT R3 WILL CONTAIN THE COUNT OF THE
;               THE NUMBER OF BYTES TRANSMITTED.
;
;               The buffer passed to this routine is assumed to be
;               a string buffer which is terminated by a '\0'.
;
;           MOV   A, $LOCBD txEEData+3
;           MOV   B,A              ;SAVE IN B REGISTER
;           MOV   DPL,_R+7         ;SET DPTR TO BUFFER ADDRESS
;           MOV   DPH,_R+6
;           MOV   _R+3,#0          ;CLEAR TOTAL COUNT VALUE
;TXEE10:
;           MOV   R0,#RDS_DATA     ;SET ADDRESS OF RAM BUFFER
;           MOV   _R+2,#MAXUDATA   ;CLEAR THE TX BYTE COUNT
;           MOV   _R+4,#0          ;CURRENT BYTES TX
;TXEE20:
;           MOVX  A,@DPTR          ;GET A BYTE
;           JZ    TXEE_BUFFER_DONE
;           MOV   @R0,A            ;STORE BUFFER
;           INC   _R+3             ;UPDATE TOTAL NUMBER OF BYTES TX
;           INC   _R+4             ;UPDATE CURRENT NUMBER OF BYTES TX
;           INC   DPTR             ;BUMP SOURCE BUFFER POINTER
;           INC   R0               ;BUMP TARGET BUFFER POINTER
;           DJNZ  _R+2,TXEE20
;
;           TRANSMIT THE BUFFER NOW
;
;           MOV   RDS_MODE,#1      ;SET START OF FRAME
;           MOV   _R+6,#RDS_MODE   ;SET START ADDRESS
;           MOV   _R+7,_R+4        ;SET TX DATA BYTE COUNT
;           MOV   A,_R+4           ;CHECK FOR ZERO BYTES
;           JZ    TXEE_EXIT
;           MOV   RDS_CMDVAL,B     ;STORE COMMAND VALUE
;           CALL  WRTCARD
;           JMP   TXEE10
;TXEE_BUFFER_DONE:
;
;           CHECK FOR FINAL TRANSMISSION
;
;           MOV   A,_R+4           ;CHECK FOR HOLDING DATA
;           JZ    TXEE_EXIT        ;BRANCH IF NONE
;
;           TRANSMIT THE BUFFER NOW
;
;           MOV   RDS_MODE,#1      ;SET START OF FRAME
;           MOV   _R+6,#RDS_MODE   ;SET START ADDRESS
;           MOV   _R+7,_R+4        ;SET TX DATA BYTE COUNT
;           MOV   RDS_CMDVAL,B     ;STORE COMMAND VALUE
```

- 32 -

Jan 25 18:32 1993  asminf.msa Page 3

```
;          CALL    WRTCARD
;
;          FLUSH RESIDUAL DATA OUT THE UART TO
;          COMPLETE THE TRANSMISSION PROCESS
;
;TXEE_EXIT:
; 16.              return (byte count);
;          MOV     R7,_R+3
;          MOV     R6,#0
; 17.      }
;          RET
; 18.
PAGE
; 19.      int receiveData()
; 20.      {
;
;
;          C INTERFACE ROUTINE TO RECEIVE A FRAME
;          MEMORY MODEL IS SMALL.
;
;          INTERFACE:
;                  char count = receiveData()
;
;          NOTES:
;                  The system returns the number of data bytes
;                  that have been read.
;
;                  The data byte count returned to the user does
;                  not include the frame overhead. This means
;                  that a frame which contains only a header and
;                  crc will return a data byte count of zero.
;
;
;
;
receiveData:
           CALL    RDCARD
           MOV     _R+7,RDS_CMDLTH              ;RETURN BYTE COUNT
; 21.              return (0);
           MOV     R6,#0
; 22.      }
           RET
; 23.

PAGE
; 24.      int TxRAMData(char *buffer, char command, char count)
; 25.      {
;TxRAMData:
;          MOV     $LOCBD TxRAMData+2,R7
;          MOV     $LOCBD TxRAMData+1,R6
;          MOV     $LOCBD TxRAMData,R5
; 26.
;
```

```
;       routine to WRITE RAM data TO the serial I/O port.
;       MEMORY MODEL IS SMALL.
;
;       INTERFACE:
;               char count = TxRAMData(char BUFFER,char COMMAND,char BCOUNT)
;
;       NOTES:
;               AT EXIT R3 WILL CONTAIN THE COUNT OF THE
;               THE NUMBER OF BYTES TRANSMITTED.
;
;
;
;           MOV     _R+4,$LOCBD TxRAMData+3     ;SAVE COMMAND
;           MOV     _R+5,$LOCBD TxRAMData+4     ;SAVE TX COUNT
;           MOV     _R+1,_R+7                   ;BUFFER ADDRESS
;           MOV     _R+3,#0                     ;CLEAR TOTAL COUNT VALUE
;           MOV     A,_R+5                      ;CHECK FOR ZERO COUNT
;           JZ      RAMTX_EXIT                  ;BRANCH IF BYTE COUNT IS ZERO
;
;       SET THE LOOP TO CONTROL MOVING
;       DATA FROM SOURCE BUFFER TO THE
;       TRANSMIT BUFFER.
;
;RAMTX10:
;           MOV     R0,#RDS_DATA                ;SET ADDRESS OF RAM BUFFER
;           MOV     _R+2,#MAXUDATA              ;CLEAR THE TX BYTE COUNT
;           MOV     _R+4,#0                     ;CURRENT BYTES TX
;
;       MAIN LOOP TO MOVE DATA FROM THE SOURCE
;       BUFFER TO THE TRANSMIT BUFFER.
;
;RAMTX20:
;           MOV     A,@R1                       ;GET DATA BYTE
;           MOV     @R0,A                       ;SAVE DATA BYTE
;           INC     _R+3                        ;UPDATE TOTAL NUMBER OF BYTES TX
;           INC     _R+4                        ;UPDATE CURRENT NUMBER OF BYTES TX
;           DJNZ    _R+5,RAMTX30                ;BRANCH WHEN ALL DATA HAS NOT BEEN TX'ED
;           JMP     RAMTX_BUFFER_DONE           ;BRANCH WHEN ALL DATA HAS BEEN TX'ED
;RAMTX30:
;           INC     _R+1                        ;BUMP SOURCE BUFFER POINTER
;           INC     _R+0                        ;BUMP TARGET BUFFER POINTER
;           DJNZ    _R+2,RAMTX20                ;CHECK FOR TX BUFFER BEING FULL
;
;       TRANSMIT A FRAME OF THE BUFFER NOW
;
;           MOV     RDS_MODE,#1                 ;SET START OF FRAME
;           MOV     _R+6,#RDS_MODE              ;SET START ADDRESS
;           MOV     _R+7,_R+4                   ;SET TX DATA BYTE COUNT
;           MOV     RDS_CMDVAL,_R+5             ;STORE COMMAND VALUE
;           CALL    WRTCARD
;           JMP     RAMTX10
```

Jan 25 18:32 1993  asminf.msa Page 5

```
;RAMTX_BUFFER_DONE:
;
;       CHECK FOR FINAL TRANSMISSION
;
;       MOV     A,_R+4          ;CHECK FOR HOLDING DATA
;       JZ      RAMTX_EXIT      ;BRANCH IF NONE
;
;       TRANSMIT THE BUFFER NOW
;
;       MOV     RDS_NODE,#1         ;SET START OF FRAME
;       MOV     _R+6,#RDS_NODE      ;SET START ADDRESS
;       MOV     _R+7,_R+4           ;SET TX DATA BYTE COUNT
;       MOV     RDS_CMDVAL,_R+5     ;STORE COMMAND VALUE
;       CALL    WRTCARD
;
;       COME HERE TO EXIT SEGEMENT
;
;RAMTX_EXIT:
; 27.            return (0);
;       MOV     R7,_R+3
;       MOV     R6,#0
; 28.  )
;       RET PAGE
;
;       Routine to copy RAM into EE PROM, callable from C.
;
;       Interface:
;               (void) c_byte_write(data unsigned char count,
;                                   data unsigned char *source,
;                                   data unsigned char *dest);
;       Notes:
;               Although the third parameter must be stored in RAM,
;               the address itself must point to EE PROM.
c_byte_write:
        mov     _R, $LOCBD c_byte_write+3     ; Put RAM address into R0
        mov     _R+5, $LOCBD c_byte_write+5   ; Put EEPROM address...
        mov     DPH, _R+5
        mov     _R+5, $LOCBD c_byte_write+6   ; into DPTR.
        mov     DPL, _R+5
                                              ; Count already in R7
        CLR     EA                            ; Turn off interrupts
        call    BYTE_WRITE   ; Call masked ROM to do the transfer
        SETB    EA                            ; Turn interrupts back on
        ret PAGE
;
;       Routine to copy a pointer value into a EE PROM resident
;       C pointer variable. Callable from C.
;
;       Interface:
```

- 35 -

Jan 25 18:32 1993 asminf.msa Page 6

```
;               (void) copy_ptr_to_EE(data unsigned char *source,
;                                     data unsigned char **dest);
;       Notes:
;               Although the second parameter must be stored in RAM,
;               the address itself must point to EE PROM.
copy_ptr_to_EE:
        mov     $LOCBD copy_ptr_to_EE,   _R+5    ; Save source ptr value
        mov     $LOCBD copy_ptr_to_EE+1, _R+6
        mov     $LOCBD copy_ptr_to_EE+2, _R+7
        mov  _R, #$LOCBD copy_ptr_to_EE  ; Put RAM address into R0
        mov     _R+5, $LOCBD copy_ptr_to_EE+4   ; Put EEPROM address...
        mov     DPH, _R+5
        mov     _R+5, $LOCBD copy_ptr_to_EE+5   ; into DPTR.
        mov     DPL, _R+5
        mov     _R+7, #3                         ; Put count in R7
        call    BYTE_WRITE        ; Call masked ROM to do the transfer
        ret
PAGE
;
;
;       Routine to send the buffer to the workstation.
;       C pointer variable. Callable from C.
;       Send it the number of bytes to send and the command code.
;
;       Interface:
; 1.    void TxRamBuffer(unsigned char count, unsigned char command)
;
; 2.    {
TxRamBuffer:
        MOV     $LOCBD TxRamBuffer,R7
        MOV     RDS_MODE,#1                     ;SET START OF FRAME
        MOV     _R+7,$LOCBD TxRamBuffer ;SET TX DATA BYTE COUNT
        MOV     _R+6,#RDS_MODE                  ;SET START ADDRESS
        MOV     RDS_CMDVAL,$LOCBD TxRamBuffer+1     ;STORE COMMAND VALUE
        CALL    WRTCARD

; 3.    }
        RET

PAGE
;
;       Routine to set a dummy timer 0 interrupt handler.
;       This is strictly a workaround for an unexplained problem with the
;       masked ROM code that is supposed to ignore the interrupt by default.
;
;       Interface:
;               (void) SetTimr0Hdlr();
;
; SetTimr0Hdlr:
;       MOV     DPTR, #IGNORE
;       CALL    SET_TIMER_ZERO
;IGNORE:
;       RET
```

- 36 -

Jan 25 18:32 1993 asminf.msa Page 7

```
;
PAGE
;
;       Routine to set a dummy timer 0 interrupt handler.
;       This is strictly a workaround for an unexplained problem with the
;       masked ROM code that is supposed to ignore the interrupt by default.
;
;       Interface:
;               (void) StealStack(unsigned char amount);

STACK_BASE      EQU     4CH     ; Starting stack location as set by masked ROM
STACK_TOP       EQU     7FH     ; Last legal stack location
StealStack:
        MOV     A, R7           ; Compute new stack base...
        ADD     A, #STACK_BASE  ;   by adding in the amount we want to steal...
                                ;   from the bottom
        CLR     C               ; No borrow
        SUBB    A, #STACK_TOP+1 ; Find out if new stack bottom is a
                                ;   legal address
        JNC     WONTFIT         ; Caller stole too many bytes
        MOV     R1, SP          ; Save the current stack pointer contents MOV     A, R1           ; Compute new SP value...
        ADD     A, R7           ;   by adding count of stolen bytes to current S
        MOV     R0, A           ; Save new SP value
        CLR     C               ; No borrow
        SUBB    A, #STACK_TOP+1 ; Find out if new stack top is a legal address
        JNC     WONTFIT         ; It isn't
        MOV     A, R1           ; Get old SP
        CLR     C               ; No borrow
        SUBB    A, #STACK_BASE-1 ; Bytes to move = old SP - old SP base + 1
        MOV     R7, A           ; Save count for loop control
        CLR     EA              ; Disable all interrupts while we're messing...
                                ;   with the stack.
        MOV     SP, R0          ; Set new SP
MOV_STACK:                      ; Move the current contents of the stack up past...
                                ;   the stolen memory area
        MOV     A, @R1          ; Get next byte of current stack
        MOV     @R0, A          ; Move it to its new home
        DEC     R1              ; Point to next item of current stack to move
        DEC     R0              ; Point to location of item on new stack
        DJNZ    R7, MOV_STACK   ; Go move the next word
        SETB    EA              ; Reenable interrupts
        RET                     ; Return to caller
WONTFIT:
        SETB    EA              ; Reenable interrupts
DIEHERE:
        SJMP    DIEHERE         ; Loop forever until we're rescued.
        END
```

What is claimed is:

1. A system for authenticating a user to any service or computer on a heterogenous computer network comprising:

at least one workstation in communication with a network; and a removable, personally protectable coprocessor adapted to communicate with the workstation, the coprocessor adapted to receive user-provided initialization information from the workstation, the coprocessor adapted to receive signals including first encrypted authentication information from the workstation, the coprocessor including a preselected first key to decrypt the first encrypted authentication information, the coprocessor further programmed to assemble second authentication information and to encrypt the second authentication information using at least one of (i) a key contained within the first encrypted authentication information and (ii) a preselected second key and to send the second encrypted authentication information to the network via the workstation, whereby the user is authenticated to access the networked computer or service.

2. The system of claim 1 wherein the first and second keys are preprogrammed into the personally protectable coprocessor.

3. The system of claim 2 wherein the first and second keys are preprogrammed in encrypted form into the personally protectable coprocessor.

4. A system for authenticating a user to any service or computer on a heterogenous computer network comprising:

one authorization server in communication with the network;

at least one workstation in communication with the network; and a removable, personally protectable coprocessor adapted to communicate with the workstation, the coprocessor adapted to receive user-provided initialization information from the workstation, the coprocessor adapted to receive signals including first encrypted authentication information from the workstation, the coprocessor programmed to include a preselected first key to decrypt the first encrypted authentication information, the coprocessor further programmed to receive signals including a preselected second key from the authorization server, the coprocessor further programmed to assemble second authentication information and to encrypt the second authentication information using at least one of (i) a key contained within the first encrypted authentication information and (ii) the preselected second key, and to send the second encrypted authentication information to the network via the workstation, whereby the user is authenticated to access the networked computer or service.

* * * * *